E. A. NELSON.
SPRING WHEEL.
APPLICATION FILED FEB. 7, 1910.
997,151.
Patented July 4, 1911.
2 SHEETS—SHEET 1.
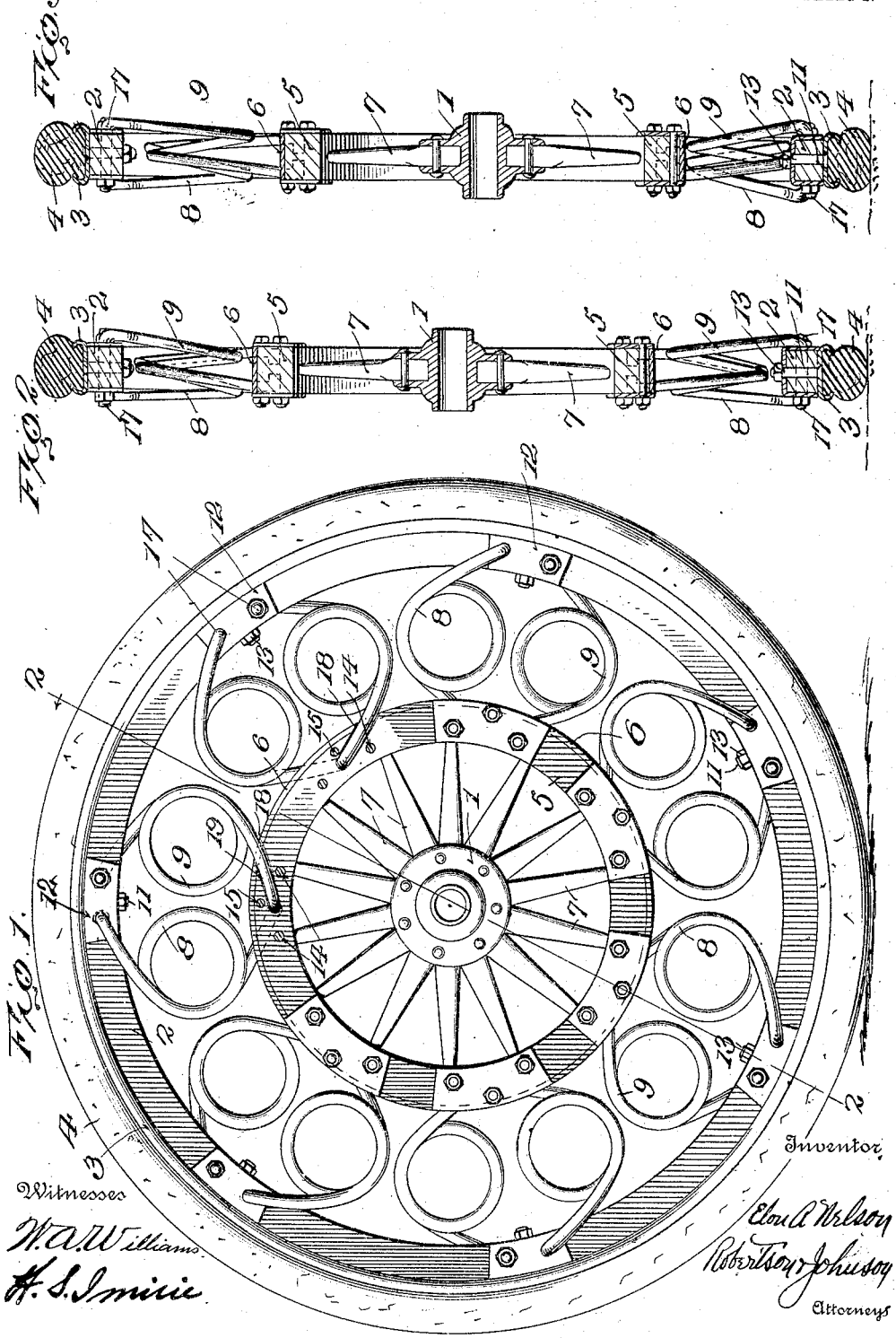
Witnesses
W. A. Williams
H. S. Imirie
Inventor
Elon A. Nelson
Robertson & Johnson
Attorneys

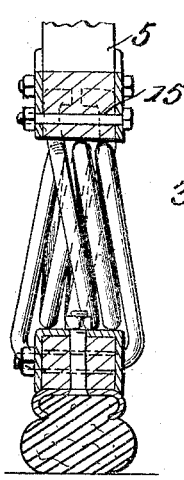
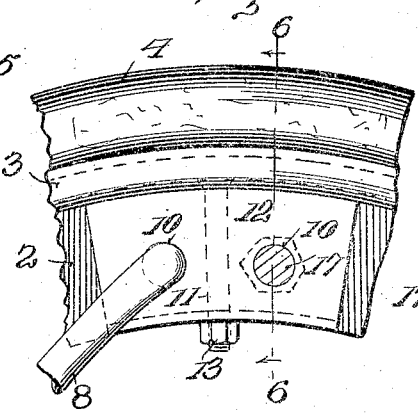
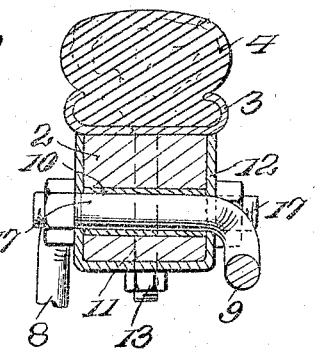
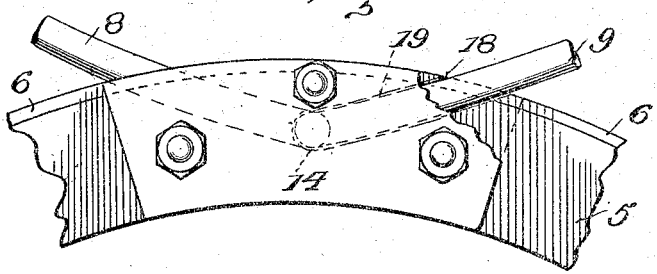
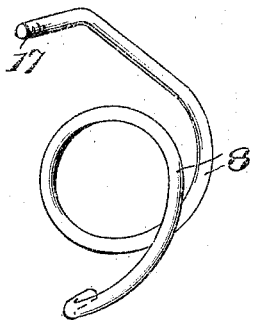
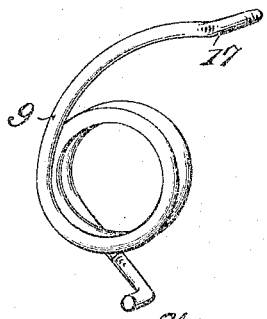

UNITED STATES PATENT OFFICE.

ELON A. NELSON, OF CHICAGO, ILLINOIS.

SPRING-WHEEL.

997,151.  Specification of Letters Patent.  Patented July 4, 1911.

Application filed February 7, 1910. Serial No. 542,555.

*To all whom it may concern:*

Be it known that I, ELON A. NELSON, a citizen of the United States, and a resident of Chicago, in the county of Cook and State of Illinois, have invented certain new and useful Improvements in Spring-Wheels, of which the following is a specification.

This invention relates to a vehicle wheel comprising a non-resilient hub and felly with cushioning means interposed between to absorb shock and jar and which will render the employment of a pneumatic tire unnecessary.

Generally speaking, my invention, in its preferred embodiment, comprises a hub, a felly, a rim intermediate the two and concentric therewith and a cushioning means connecting the felly and the aforesaid rim, such cushioning means comprising a series of intermediately coiled resilient members extending in the plane of the wheel, the said members preferably being rigidly held at one end and pivotally mounted at the other.

By having the resilient members extending in the plane of the wheel compressive and torsional strains are transmitted throughout the extent of the said resilient members and in the direction of their length. By having these resilient members coiled intermediate their ends and extending in the plane of the wheel I provide a self-protecting spring that will " give " to the extent desired and will then form a shock absorbing cushion which will also protect the spring from strain or breakage.

Further advantages are obtained by rigidly securing these resilient members at one of their ends and journaling their other ends so that in addition to the inherent elasticity in the resilient member, the latter is enabled to turn on its journaled end as a pivot point.

In the drawings forming part hereof: Figure 1 is a view in side elevation of the assembled wheel, two of the clamping plates on the intermediate rim being removed. Fig. 2 is vertical section through the line 2—2 of Fig. 1. Fig. 3 is a view similar to Fig. 2 but with the parts of the wheel in the position they assume when the wheel has been subjected to a sudden, excessive shock. Fig. 4 is a fragmentary view similar to the lower part of Fig. 3 showing a modified form of coil. Fig. 5 is a fragmentary view in side elevation showing the felly rim and clamping channel plate operatively connected. Fig. 6 is a vertical section on the line 6—6 Fig. 5. Fig. 7 is a view in side elevation showing a clamping plate on the intermediate rim. Figs. 8 and 9 are detail perspective views of the two oppositely facing spring members, Fig. 9 showing a modified form of coil.

Referring to the drawings: The reference numeral 1 indicates a central hub of usual construction and 2 a felly carrying a tire rim and cushion tire numbered 3 and 4 respectively.

Between the central hub and the felly I provide an intermediate rim 5 preferably provided with a metallic ring 6 to strengthen the same, the rim being rigidly connected to the hub 1 by spokes 7 or other suitable means. This it will be seen, practically forms a complete inner wheel of great strength. Connecting this intermediate rim of the inner wheel with the felly are a series of resilient members 8 and 9 preferably formed of spring steel and with a coil or coils intermediate their ends. These members are preferably rigidly attached at their inner ends to the intermediate rim and have their outer ends journaled in the felly to permit of a turning movement relative thereto. I accomplish this connection by the following means.

At points around the felly uniformly distant from each other, I provide a series of adjacent lateral apertures 10 preferably two in number at each point and a vertical aperture 11 intermediate the two. U-shaped channel plates 12 are attached to the felly at these points, these channel plates having apertures coinciding with the lateral and vertical apertures in the felly. The tire rim 3 is preferably secured to the felly by bolts or rivets 13 which pass through the vertical apertures in the felly 2 and the coinciding ones in the channel plates 12, thus securing the latter also to the felly. The intermediate rim 5 is likewise provided with a series of lateral apertures numbered 14 and 15 respectively, the apertures 14 being preferably three in number and in circumferential alinement while the apertures 15 are preferably directly above the central one of the three aforesaid apertures for the purpose hereinafter described. The central one of these three alining apertures 14, and the two lateral apertures in the felly 2 and channel plates 12, are intended to receive the inner and outer ends respectively of the resilient members 8 and 9 which I will now describe. These members are preferably used in pairs, the individual members of each pair being reversely applied. Each pair comprises resilient members 8 and 9, each of which is provided with an intermediate coil or coils and at a short distance from each end is bent at right angles and preferably in opposite directions, one bent end 17 being screw-threaded and somewhat longer than the other. These members are preferably attached to the felly and intermediate rim from opposite sides in pairs, one member facing the other. The screw threaded ends 17 of each pair are inserted through the apertures 10, one from each side of the felly and are held therein by nuts engaging with the screw threads on the ends and bearing against the felly. The other and shorter bent ends of these resilient members are then inserted in the central one of the three alined apertures 14 in the intermediate rim, one from each side of the rim, the short bent end of each spring member preferably entering this rim on the opposite side from that on which its longer and screw threaded end entered the felly.

It will be seen from the arrangement described above that I have interposed between the felly and the intermediate rim a cushioning means comprising intermediately coiled spring members extending from one side of the felly to the opposite side of the intermediate rim with the coils between these two parts. The turns of the coil can not bind on each other as the ends of the members are attached on opposite sides of the felly and rim. The springs take up the normal shocks but in the event of sudden or excessive loads, the springs will "give" until the intermediate rim approaches the felly to the extent permitted by the large coils of the springs. In the event of such excessive shocks, the said large coils fill the space between the intermediate rim and felly at that side of the wheel and thus provide a shock absorbing means, which will prevent undue strain from being given to the springs. Thus the springs are self protecting.

In order to allow the short ends of the spring to lie flush with the sides of the intermediate rim and rigid therewith I notch the metallic ring 6, as at 18 (see Figs. 1 and 7), and groove the side of the rim 5, as at 19. The short ends of each of the pair of resilient members being inserted in the intermediate rim 5 under these conditions, clamping plates are applied to each side of the intermediate rim and bolted thereto, the said plates having apertures therein registering with the two end alining apertures 14 and the non-alining aperture 15 in the intermediate rim 5 and bolts being placed therethrough. It will be noted that I have arranged the non-alining apertures 15 directly above the central alined aperture which receives the end of the resilient member. The bolt extending through this aperture therefore strengthens the rim at the point of greatest strain.

As the clamping plates hold the inner ends of the resilient members in the notches in the metallic ring 6, in the grooves 19 in the rim 5 and in the lateral recesses in said rim, it will be seen that they are held perfectly rigid. The outer ends, however, being journaled in the lateral recesses in the felly are free to turn with relation thereto and as the springs extend in the plane of the wheel any pressure or torsion on them will find compensation in the compression of the spring, the turning movement of its journaled end affording additional resiliency and providing an efficient cushioning means. And as before described, in the event of sudden or excessive jars, the springs are so disposed that they entirely fill the space between the inner wheel and tire or rim section and thus are self protecting.

What I claim as my invention is:—

1. A wheel comprising in combination a hub, a felly, and cushioning means between said hub and felly comprising spring elements provided with coils between said hub and felly, extending in the plane of the wheel and out of contact with said hub and felly while yielding to normal shock but contacting therewith and bridging the space therebetween in the event of overload or excessive shock.

2. A wheel comprising in combination an inner wheel, an outer tire section, and cushioning means therebetween comprising spring elements provided with coils extending in the plane of the wheel and between said inner wheel and tire section, said coils being out of contact with said inner wheel and tire section while yielding to normal shock but contacting therewith and bridging the space therebetween in the event of overload or sudden shock.

3. A wheel comprising in combination, an inner wheel, an outer tire section, and spring elements interposed between the two, the said spring elements having their ends connected to the said inner wheel and outer tire section respectively, and being provided with coils extending in the plane of the wheel and between said inner wheel and outer tire section, said coils while yielding to normal shock being out of contact with said inner wheel and tire section but contacting therewith and bridging the space therebetween in the event of overload or excessive shock.

4. A wheel comprising in combination, an inner wheel, an outer tire section, and spring elements interposed therebetween, having their ends secured one end rigidly and the other pivotally, to said inner wheel and tire section, and being provided with coils extending in the plane of the wheel and between said inner wheel and outer tire section, said coils while yielding to normal shock being out of contact with said inner wheel and tire section but contacting therewith and bridging the space therebetween in the event of overload or excessive shock.

5. A wheel comprising in combination a hub, an inner wheel connected therewith, an outer tire section and spring elements interposed between said inner wheel and tire sections, having their ends connected to said inner wheel and outer tire section at opposite sides thereof, and provided intermediate their ends with coils extending in the plane of the wheel and between said inner wheel and outer tire section, said coils while yielding to normal shock being out of contact with said inner wheel and tire section but contacting therewith and bridging the space therebetween in the event of overload or excessive shock.

6. A wheel comprising in combination a hub, an inner wheel connected therewith, an outer tire section and cushioning means interposed between said inner wheel and outer tire section, comprising pairs of opposed spring elements, said elements having their ends connected to said inner wheel and tire section at opposite sides thereof, and provided intermediate their ends with coils extending in the plane of the wheel and between said inner wheel and tire section, said coils while yielding to normal shock being out of contact with said inner wheel and tire section but contacting therewith and bridging the space therebetween in the event of overload or excessive shock.

7. A wheel comprising in combination a hub, an inner wheel connected therewith, an outer tire section, and spring elements interposed between said inner wheel and outer tire section, having their ends, one rigidly secured to and the other journaled in said inner wheel and tire section at opposite sides thereof, and provided intermediate their ends with coils extending in the plane of the wheel and between said inner wheel and outer tire section, said coils while yielding to normal shock being out of contact with said inner wheel and tire section but contacting therewith and bridging the space therebetween in the event of overload or excessive shock.

8. A wheel comprising in combination a hub, an inner wheel connected therewith, an outer tire section, cushioning means between said inner wheel and outer tire section comprising spring elements having their ends bent for insertion in the inner wheel and outer tire section at opposite sides thereof respectively, means for rigidly securing one of said ends to its connected part, means for journaling the other end in its connected part, and coils formed in said spring elements intermediate their ends, extending in the plane of the wheel and between said inner wheel and outer tire section, said coils while yielding to normal shock being out of contact with said inner wheel and tire section but contacting therewith and bridging the space therebetween in the event of overload or excessive shock.

9. A wheel comprising in combination, a hub, an inner wheel connected therewith, an outer tire section, and cushioning means between said inner wheel and outer tire section comprising a series of opposed spring elements each having their ends bent at right angles and inserted in opposite sides of the inner wheel and outer tire section respectively, the opposed spring elements having their corresponding ends inserted in opposite sides of the said inner wheel and tire section; clamping plates on said inner wheel holding the inner ends of said spring elements rigid with respect to said inner wheel and means for journaling the outer ends of said resilient members in said outer tire section, the said spring elements being provided intermediate their ends with coils extending in the plane of the wheel and between the said inner wheel and outer tire sections, said coils while yielding to normal shock being out of contact with said inner wheel and tire section but contacting therewith and bridging the space therebetween in the event of overload or excessive shock.

10. A wheel comprising in combination, a hub, a felly, a rim between the two and concentric therewith, a tire rim on the felly, a plurality of sets of lateral apertures in the felly, a vertical aperture therein intermediate said lateral apertures, U-channel plates embracing said felly and apertured to register with said apertures in said felly, a bolt connecting said tire rim and said channel plate through said vertical aperture, opposed coiled resilient members between said felly and intermediate rim having their ends bent at right angles, the upper ends of said members being inserted from opposite sides through the lateral apertures in said felly and channel plates and held journaled therein, and the lower bent ends of said resilient members being inserted through opposite sides of said intermediate rim, and clamping plates, arranged on either side of the intermediate rim at the points of such insertions, and bolted through said rim to clamp the inner ends of the resilient members rigid with relation to said rim, substantially as described.

Signed by me at Washington, D. C., this 3rd day of February, 1910.

ELON A. NELSON.

Witnesses:
Thos. E. Robertson,
Henderson F. Hill.